United States Patent
Bredemeier

[11] 3,804,095
[45] Apr. 16, 1974

[54] LASER BEAM INSTRUMENT FOR UTERINE CERVICAL CONIZATION

[76] Inventor: Herbert C. Bredemeier, 5 Bridle Path, Middlesex, Mass. 01770

[22] Filed: Mar. 24, 1972

[21] Appl. No.: 237,614

[52] U.S. Cl. .......................... 128/303.1
[51] Int. Cl. ................. A61b 17/36, A61n 5/00
[58] Field of Search ........... 128/2 B, 303.1, 303.15, 128/395

[56] References Cited
UNITED STATES PATENTS

| | | | |
|---|---|---|---|
| 3,096,767 | 7/1963 | Gresser et al. | 128/303.1 UX |
| 3,357,422 | 12/1967 | Creelman | 128/002 B |
| 3,467,099 | 9/1969 | Lotmar | 128/303.1 |
| 3,481,340 | 12/1969 | McKnight et al. | 128/395 |
| 3,628,522 | 12/1971 | Kato | 128/2 B |
| 3,710,798 | 1/1973 | Bredemeier | 128/303.1 |

FOREIGN PATENTS OR APPLICATIONS

| | | | |
|---|---|---|---|
| 373,112 | 7/1939 | Italy | 128/2 B |

*Primary Examiner*—Channing L. Pace
*Attorney, Agent, or Firm*—Lane, Aitken, Dunner & Ziems

[57] ABSTRACT

An instrument for surgically removing a solid cone of tissue. An inner cylinder is rotatably fitted within an outer cylinder. Mirrors are mounted inside the inner cylinder and positioned such that a narrowly converging laser beam, traveling down the cylindrical axis, is deviated to exit the instrument in a direction which intersects the cylindrical axis at an acute angle. By rotating the inner cylinder with its mirrors, the exiting laser beam is caused to sweep out a conical surface. In cervical conization, the instrument is inserted so that its distal end is adjacent the cervix and the beam is incident thereon to excise a cone-shaped sample. In one embodiment, an axial guide pin protrudes from the distal end for insertion through the cervical os.

15 Claims, 7 Drawing Figures

PATENTED APR 16 1974 3,804,095

INVENTOR
HERBERT C. BREDEMEIER

*INVENTOR*
HERBERT C. BREDEMEIER

LASER BEAM INSTRUMENT FOR UTERINE CERVICAL CONIZATION

BACKGROUND OF THE INVENTION

The invention relates generally to the field of surgical instruments, and more particularly to cutting instruments employing laser beams and to the technique of cervical conization.

In the diagnosis and treatment of cervical pathology, it is standard medical procedure to remove a small portion of the cervix. The general shape of a typical lesion in this region, and therefore the shape of the tissue sample removed, is conical, with the apex of the cone lying on the cervical os pointing into the uterus. The surgical procedure is called conization and was usually done with a scalpel or similar cutting instrument requiring tissue contact. The delicate, time-consuming operation required general anesthesia and caused much bleeding and discomfort to the patient. The surgeon had to be extremely careful to avoid disseminating viable tissue cells which might be malignant.

SUMMARY OF THE INVENTION

The general purpose of the invention is to improve the means of performing conization. Another object of the invention is to reduce the trauma to the patient during the operation. A further object of the invention is to perform conization without using an instrument requiring tissue contact. Still another object of the invention is to simplify the operative procedure for conization.

These and other objects of the invention are accomplished by providing means for rotating an angled laser beam, incident on the tissue to be sampled, about an intersecting axis which, in cervical conization, coincides generally with the cervical o's. An instrument insertable into the vagina for conization of the cervix includes a pair of co-axial cylinders, one fitted within the other for rotation. A mirror system is rigidly positioned in the inner cylinder at the distal end of the instrument adjacent to the work site to deviate a narrowly converging laser beam traveling down the cylindrical axis from the opposite or proximal end, such that the beam exits the distal end of the instrument in a direction which intersects the cylindrical axis at an acute angle. To sweep out a conical surface with the laser beam, the inner cylinder is rotated about its axis by means of a drive mechanism located at the proximal end of the instrument. The instrument can be fitted to the end of a stereo laser endoscope having a central viewing axis co-axial with the laser beam so that the tissue on which the beam is incident can be observed.

In one embodiment, a co-axial guide pin is affixed to the inner cylinder and protrudes from the distal end of the instrument. The pin is insertable through the cervical os to maintain proper positioning of the instrument during conization and to provide a retaining means facilitating removal of the isolated cone after conization.

DESCRIPTION OF THE PREFERRED EMBODIMENTS

Figure 1:
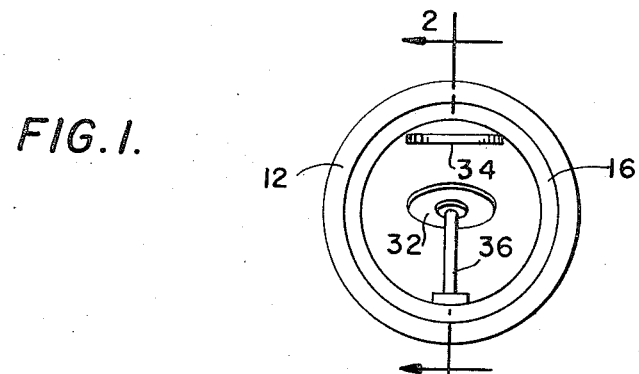
FIG. 1 is a view of the distal end of the conization instrument.
Figure 2:
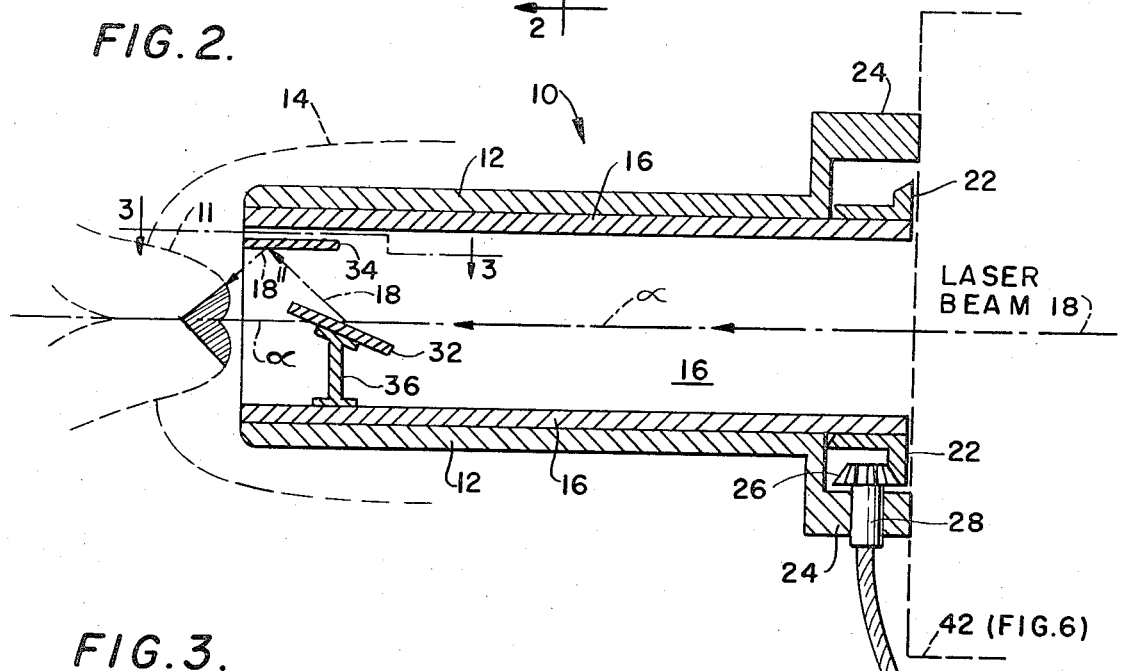
FIG. 2 is a cross-sectional view taken along lines 2—2 of FIG. 1 showing the instrument in more detail and schematically illustrating its use in conization of the cervix.
Figure 3:
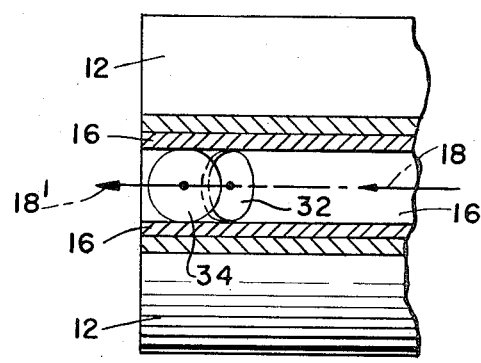
FIG. 3 is a cross-sectional view taken along lines 3—3 of FIG. 2.

A surgical instrument 10 particularly suited for conization of the cervix 11 is shown in FIGS. 1, 2 and 3. The instrument 10 generally includes an outer cylinder 12 of sufficient length to reach the cervix through the vagina 14 containing a closely fitting, co-axial inner cylinder 16 rotatable with respect to the outer cylinder 12. The proximal end of the instrument 10 is adapted to receive a narrow, converging beam of laser light 18 directed down the center of the instrument along its longitudinal axis $\alpha$. The preferred source of beam 18 is a $CO_2$ gas laser producing an infrared beam of about 10.6 micron wavelength, highly absorbable by biological tissues. Other lasers may be used depending on the application.

To rotate the inner cylinder 16, a drive mechanism is provided at the proximal end including an annular bevel gear 22 co-axial with the instrument 10 secured to the outer surface of the inner cylinder 16. The outer cylinder 12 has a portion 24 of wider diameter at the proximal end to form a housing accommodating the gear 22. A bevel drive gear or pinion 26 engaging the gear 22 is affixed to a shaft 28 rotatably carried in a bore perpendicular to the axis $\alpha$ in the portion 24 of the outer cylinder 12. The shaft 28 is connected by means of a flexible coupling 30 to a drive means (not shown) which may be a manual crank or motor. Rotation of the shaft 28 causes reduced proportional rotation of the inner cylinder 16 about its axis $\alpha$ inside the stationary outer cylinder 12.

A pair of mirrors 32 and 34 are attached at the distal end of the instrument 10 to the inside of the inner cylinder 16. The mirror 32, supported by a stand 36, lies on the axis $\alpha$. The other mirror 34 is secured by adhesive or other fastening means as closely as possible to the inside surface of the inner cylinder 16 adjacent the distal end thereof and substantially parallel to the axis $\alpha$. The mirror 32 is spaced inwardly from the mirror 34 along the axis $\alpha$ and is tilted with respect to the axis such that the beam 18 traveling down the axis $\alpha$ is deflected toward the mirror 34. The beam 18' reflected from the mirror 34 exits the distal end of the instrument 10 in a direction intersecting the axis $\alpha$ at an acute angle. This intersection is assured if the mirrors 32 and 34 are both perpendicular to a plane (the paper in FIG. 2) including the axis $\alpha$.

Rotation of the inner cylinder 16 causes the exiting laser beam 18' to sweep out a conical surface. Tissue lying in the path of the beam 18' is burned or evaporated resulting in the excision of a cone-shaped tissue sample, represented by the shaded portion of the cervix 11 (FIG. 2).

Figure 4:
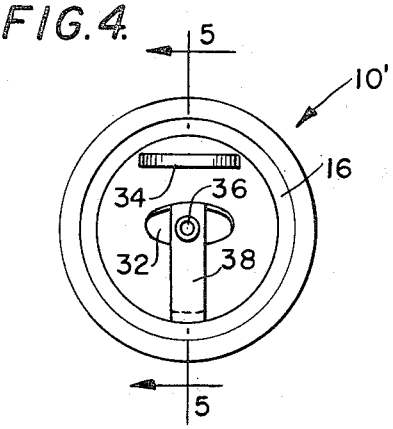
FIG. 4 is a view of the distal end of another embodiment of the conization instrument.
Figure 5:
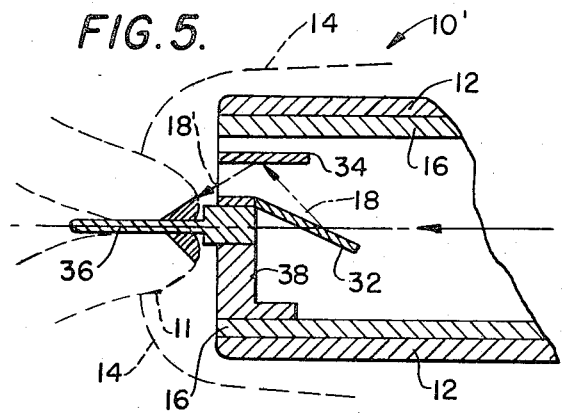
FIG. 5 is a cross-sectional view taken along lines 5—5 of FIG. 4 schematically illustrating insertion of the guide pin through the cervical os.

A modified instrument 10', as shown in FIGS. 4 and 5, is specifically adapted for cervical conization by providing an axial guide pin 36 at the distal end of the inner cylinder 16. The pin 36 projecting from the instrument 10' fits into the cervical o's, a narrow central passage through the cervix leading into the uterus. The pin 36 is connected to the inside surface of the inner cylinder 16 by a mounting bracket 38, also forming a support for the mirror 32. When inserted into the o's, the pin 36 serves as an axle to maintain proper location of the instrument 10. The pin 36 also aids removal of the excised tissue sample since the pin extends through the sample.

Figure 6:
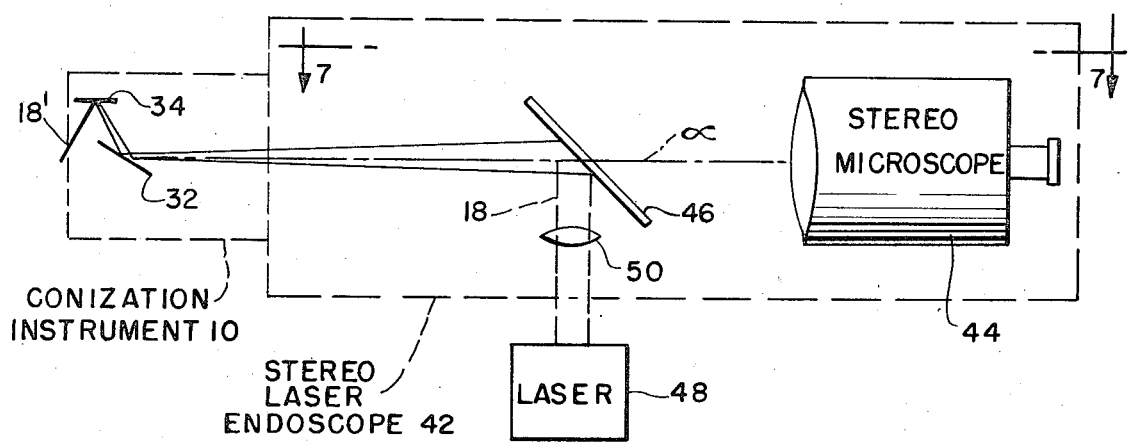
FIG. 6 is a schematic representation illustrating the use of a stereo laser endoscope with the conization instrument.
Figure 7:
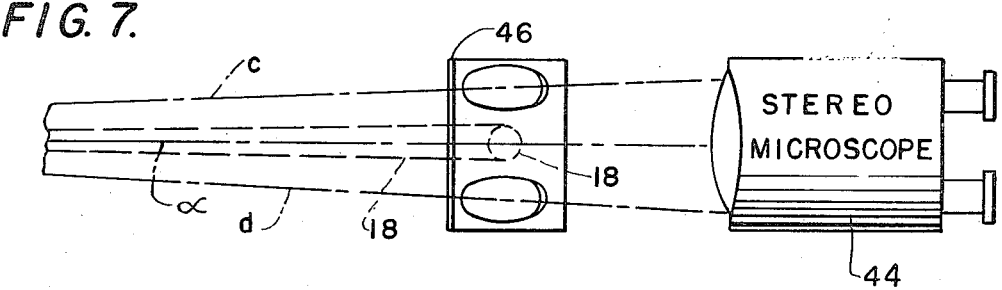
FIG. 7 is a schematic representation of the endoscope as viewed along lines 7—7 of FIG. 6 illustrating, in particular, the apertured mirror.

A laser endoscope can be used with the instrument 10 (or 10') to provide a means of viewing the point of impact of the beam 18' on the tissue. A preferred stereo laser endoscope 42 is illustrated in FIGS. 6 and 7. The endoscope 42 is the subject of applicant's copending application Ser. No. 237,790, filed Mar. 24, 1972, entitled "Stereo Laser Endoscope", assigned to the assignee of this application. The endoscope 42 employs a conventional stereo operating microscope 44 with stereo viewing axes c and d aligned with respect to the conization instrument 10 such that the axis $\alpha$ forms the bisector of the stereo axes. An oblique reflector 46 is aligned on the axis $\alpha$ between the microscope 44 and instrument 10. The reflector 46 has two viewing apertures centered respectively on the stereo axes $c$ and $d$ permitting observation of the work site. The central portion of the reflector 46 facing the instrument 10 is fully reflective. A laser source 48, preferably a $CO_2$ laser, is directed at the central portion of the reflector so that the beam 18 is reflected toward the instrument 10 along the axis $\alpha$. A converging lens is inserted between the laser source 48 and reflector 46 to focus the beam 18 on the work site.

As shown diagrammatically in FIG. 2, the endoscope 42 normally has a suitable housing to which the instrument 10 is secured in optical alignment therewith. Visibility of the work site may be impaired by the generation of smoke during laser burning of the tissue. To eliminate this problem the instrument 10 can be sealed to the laser endoscope and positive pressure can be introduced into the sealed endoscope housing (not shown) to drive the smoke away from the work site. Alternatively, suction can be used to remove the smoke. For example, a thin suction tube can be mounted on the outer cylinder 12 with its open end adjacent to the work site.

In operation, the conization instrument 10 is inserted into the vagina so that the beam 18' is incident on the cervix. The location is confined by insertion of the optional pin 36 or by means of the microscope 44. The laser beam 18' is applied to the tissue while the inner cylinder 16 is rotated, excising a conical sample. The cutting action is viewed simultaneously by means of the microscope 44. Several complete rotations of the beam 18' may be necessary depending on the beam power, speed of rotation and other factors.

Those skilled in the art will recognize that other forms of endoscopes permitting viewing and laser application can be used with the instrument 10. In addition, while the use of the instrument 10 for cervical conization has been emphasized herein, the instrument may be suitably modified for conization of other materials. The mirrors 32 and 34 may be replaced by other equivalent optical systems which perform the function of deviating the axial laser beam so that it exits the instrument in a direction intersecting the axis at an angle. Means may also be incorporated into the instrument to adjust the exit angle of the beam relative to the axis to change the size and depth of the sample.

The advantages of the invention are numerous. The surgeon's task is greatly simplified enabling confident, precise conization. Since the laser beam cauterizes as it cuts, bleeding and trauma to the patient are reduced, and the risk of dispelling malignant tissue to other areas is lessened.

It will be understood that various changes in the details, materials, steps and arrangements of parts which have been herein described and illustrated in order to explain the nature of the invention, may be made by those skilled in the art within the principle and scope of the invention as expressed in the appended claims.

What is claimed is:

1. A surgical instrument for conization of the cervix uteri, comprising an outer cylinder adapted to be inserted into the vagina toward said curvix uteri, an inner cylinder co-axially arranged within said outer cylinder for rotation with respect thereto about the common cylindrical axis, reflecting means disposed within said inner cylinder and rigidly connected thereto for deviating a beam of energy traveling down said cylindrical axis such that said beam exits said inner cylinder in a direction intersecting said axis at an acute angle, whereby rotation of said inner cylinder causes said exiting beam to sweep out a conical surface thereby isolating a cone-shaped portion of the cervix.

2. The instrument of claim 1, wherein said reflecting means includes a first mirror connected to said inner cylinder lying on said axis for deflecting said beam, at least one second mirror connected to said inner cylinder lying off said axis and optically aligned with said first mirror to deflect toward said axis the beam reflected from said first mirror.

3. The instrument of claim 2, wherein said first and second mirrors are both perpendicular to a plane including said axis.

4. The instrument of claim 1, further comprising drive means for rotating said inner cylinder with respect to said outer cylinder.

5. The instrument of claim 4, wherein said drive means includes an annular gear affixed co-axially to said inner cylinder and a pinion drivingly engaging said annular gear rotatably mounted transversely in said outer cylinder.

6. The instrument of claim 5, wherein said pinion is adapted to be connected to a drive means external to said inner and outer cylinders and said annular gear and pinion are both bevel gears.

7. The instrument of claim 1, further comprising endoscope means optically aligned with said axis for projecting said beam along said axis toward said reflecting means and for providing a view of said cervix along said axis.

8. The instrument of claim 7, wherein said endoscope means includes reflector means spaced from said co-axial cylinders lying obliquely on said axis for reflecting said beam along said axis.

9. The instrument of claim 8, wherein said reflector means includes a plate having a reflective central portion for deflecting said beam facing said reflecting means in said inner cylinder and having a pair of spaced apertures arranged to pass a respective pair of stereo viewing axes.

10. Apparatus for excising a cone-shaped sample from an object, comprising support means rotatable about an axis, reflecting means for deviating a beam of energy traveling down said axis rigidly connected to said support means for rotation therewith having a beam receiving surface lying on said axis for receiving said beam and a beam reflecting surface displaced from said axis and aligned such that said beam exits in a direction which intersects said axis at an angle.

11. The apparatus of claim 10, wherein said support means includes a first cylinder whose cylindrical axis forms said axis.

12. The apparatus of claim 11, further comprising a second cylinder co-axially and rotatably containing said first cylinder, and drive means for rotating said first cylinder with respect to said second cylinder.

13. The apparatus of claim 10, wherein said receiving surface includes a mirror connected to said support means lying obliquely on said axis and said reflecting surface includes a mirror connected to said support means lying off said axis optically aligned with said first mirror such that said beam is reflected toward said axis.

14. The apparatus of claim 13, wherein said mirrors are both perpendicular to a plane passing through said axis.

15. A surgical instrument for conization of the cervix uteri, comprising a housing adapted to be inserted into the vagina toward said cervix uteri, means for causing a laser beam to exit the distal end of said housing toward said cervix and means for causing said laser beam to move in a predetermined path defining a conical surface whereby a cone-shaped portion of the cervix is excised.

* * * * *